(12) United States Patent
Traut et al.

(10) Patent No.: US 11,663,522 B2
(45) Date of Patent: May 30, 2023

(54) TRAINING REINFORCEMENT MACHINE LEARNING SYSTEMS

(71) Applicant: Microsoft Technology Licensing, LLC, Redmond, WA (US)

(72) Inventors: Eric Philip Traut, Snoqualmie, WA (US); Marcos de Moura Campos, Encinitas, CA (US); Xuan Zhao, Fremont, CA (US); Ross Ian Story, Oakland, CA (US); Victor Shnayder, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 486 days.

(21) Appl. No.: 16/859,874

(22) Filed: Apr. 27, 2020

(65) Prior Publication Data
US 2021/0334696 A1    Oct. 28, 2021

(51) Int. Cl.
*G06F 9/44* (2018.01)
*G06F 9/455* (2018.01)
(Continued)

(52) U.S. Cl.
CPC ......... *G06N 20/00* (2019.01); *G06F 11/3466* (2013.01); *G06F 11/3664* (2013.01); *G06N 3/08* (2013.01); *G06N 10/70* (2022.01)

(58) Field of Classification Search
CPC .......... G06N 20/00; G06N 10/70; G06N 3/08; G06F 11/3466; G06F 11/3664
See application file for complete search history.

(56) References Cited

U.S. PATENT DOCUMENTS 10,766,136 B1 *  9/2020  Porter ................. G06N 3/04
10,800,040 B1 * 10/2020  Beckman ............ B25J 9/1671
(Continued)

FOREIGN PATENT DOCUMENTS

WO        2018085778 A1     5/2018
WO    WO-2018212918 A1 * 11/2018 ............. G06N 20/00
(Continued)

OTHER PUBLICATIONS

Avi Singh, End-to-End Robotic Reinforcement Learning without Reward Engineering, 2019, pp. 1-14. https://arxiv.org/pdf/1904.07854.pdf (Year: 2019).*

(Continued)

*Primary Examiner* — Mongbao Nguyen
(74) *Attorney, Agent, or Firm* — Alleman Hall Creasman & Tuttle LLP (57) ABSTRACT

A method of training a reinforcement machine learning computer system. The method comprises providing a machine-learning computer programming language including a pre-defined plurality of reinforcement machine learning criterion statements, and receiving a training specification authored in the machine-learning computer programming language. The training specification defines a plurality of training sub-goals with a corresponding plurality of the reinforcement machine learning criterion statements supported by the machine-learning computer programming language. The method further comprises computer translating the plurality of training sub-goals from the training specification into a shaped reward function configured to score a reinforcement machine learning model configuration with regard to the plurality of training sub-goals. The method further comprises running a training experiment with the reinforcement machine learning model configuration, scoring the reinforcement machine learning model in (Continued)

the training experiment with the shaped reward function, and adjusting the reinforcement machine learning model configuration based on the shaped reward function.

20 Claims, 6 Drawing Sheets

(51) Int. Cl.
| | |
|---|---|
| *G06F 9/445* | (2018.01) |
| *G06N 20/00* | (2019.01) |
| *G06F 11/34* | (2006.01) |
| *G06F 11/36* | (2006.01) |
| *G06N 10/70* | (2022.01) |
| *G06N 3/08* | (2023.01) |

(56) References Cited

U.S. PATENT DOCUMENTS

| | | | |
|---|---|---|---|
| 2014/0156577 A1* | 6/2014 | Eliasmith | G06N 3/10 706/26 |
| 2018/0293498 A1* | 10/2018 | Campos | G06N 3/105 |
| 2018/0336480 A1* | 11/2018 | Chang | G06N 20/00 |
| 2019/0236458 A1* | 8/2019 | Taylor | G06N 3/08 |
| 2019/0311220 A1* | 10/2019 | Hazard | G06K 9/6257 |
| 2019/0332951 A1* | 10/2019 | Nakahashi | G06F 16/906 |
| 2019/0354885 A1* | 11/2019 | Li | G06F 17/16 |
| 2020/0034705 A1* | 1/2020 | Pham | G06N 3/0454 |
| 2020/0065157 A1* | 2/2020 | Nag | G06N 3/02 |
| 2021/0150407 A1* | 5/2021 | Xu | G06N 3/08 |
| 2021/0237266 A1* | 8/2021 | Kalashnikov | B25J 9/1602 |

FOREIGN PATENT DOCUMENTS

| | | | | |
|---|---|---|---|---|
| WO | 2018236674 A1 | 12/2018 | | |
| WO | 2020056299 A1 | 3/2020 | | |
| WO | WO-2020056299 A1 * | 3/2020 | | G05D 1/0221 |
| WO | WO-2020068141 A1 * | 4/2020 | | G06N 20/00 |

OTHER PUBLICATIONS

Piergiuseppe Mallozzi, A Runtime Monitoring Framework to Enforce Invariants on Reinforcement Learning Agents, 2019, pp. 5-12. https://dl.acm.org/doi/pdf/10.1109/RoSE.2019.00011 (Year: 2019).*

Carlos Florensa, Automatic Goal Generation for Reinforcement Learning Agents, 2018, pp. 1-14. https://arxiv.org/pdf/1705.06366.pdf (Year: 2018).*

Anand Balakrishnan, Structured Reward Shaping using Signal Temporal Logic specifications, 2019, pp. 1-6. https://ieeexplore.ieee.org/stamp/stamp.jsp?tp=&arnumber=8968254 (Year: 2019).*

Pan, et al., "Human-Interactive Subgoal Supervision for Efficient Inverse Reinforcement Learning", In Repository of arXiv:1806.08479v1, Jun. 22, 2018, 8 Pages.

"International Search Report and Written Opinion Issued in PCT Application No. PCT/US2021/022271", dated Aug. 10, 2021, 14 Pages.

Jothimurugan, et al., "A Composable Specification Language for Reinforcement Learning Tasks", In Journal of Advances in Neural Information Processing Systems, Dec. 8, 2019, pp. 1-11.

* cited by examiner

| PRE-DEFINED TRAINING CRITERION STATEMENT | SYNTAX | EXAMPLE |
|---|---|---|
| 302A<br><br>REACH | 302B<br>reach \<GoalName\>:<br>\<variable\><br>in Goal.Range<br>(\<lower_bound\>,<br>\<upper_bound\>)<br><br>reach \<GoalName\>:<br>\<variable\> in Goal.Sphere<br>(\<center\>, \<radius\>) | 302C<br><br>reach TargetLocation:<br><br>GetDistanceToTarget(State)<br>in Goal.Range<br>(0, DroneRadius) |
| 303A<br><br>AVOID | 303B<br>avoid \<GoalName\>:<br>\<variable\><br>in Goal.Range<br>(\<lower_bound\>,<br>\<upper_bound\>)<br><br>avoid \<GoalName\>:<br>\<variable\> in<br>Goal.RangeAbove<br>(\<lower_bound\>) | 303C<br><br>avoid LeaveLocation:<br><br>GetDistanceToTarget(State)<br>in Goal.RangeAbove<br>(DroneSurveyRadius ) |
| 304A<br><br>DRIVE | 304B<br>drive \<GoalName\>:<br>\<variable\><br>in Goal.Range<br>(\<lower_bound\>,<br>\<upper_bound\>) within \<n\><br><br>reach \<GoalName\>:<br>\<variable\> in Goal.Sphere<br>(\<center\>, \<radius\>)<br>within \<n\> | 304C<br><br>drive AroundLocation:<br><br>GetDistanceToTarget(State)<br>in Goal.Range<br>(0, DroneSurveyRadius)<br>within 30 |
| 305A<br><br>OPTIMIZE | 305B<br>minimize \<GoalName\>:<br>\<variable\><br>in Goal.Range<br>(\<lower_bound\>,<br>\<upper_bound\>)<br><br>maximize \<GoalName\>:<br>\<variable\> in<br>Goal.RangeAbove<br>(\<lower_bound\>) | 305C<br><br>minimize TargetLocation:<br><br>GetDistanceToTarget(State)<br>in Goal.RangeBelow<br>(DroneRadius) |

FIG. 4

| PRE-DEFINED TRAINING CRITERION STATEMENT | SUB-GOAL SPECIFIC REWARD FUNCTION |
|---|---|
| 302A<br><br>REACH | 402<br>`If distance >= target_region_size: Reward = 0`<br>`Elif distance < target_region_size:`<br>    `Reward = 1 - distance/target_region_size`<br>`Elif distance <= 0:`<br>    `Reward = 1 + (max_iter_count - cur_iter_count)` |
| 303A<br><br>AVOID | 403<br>`If distance <= 0:`<br>    `Reward = 1 - (max_iter_count + cur_iter_count)`<br>`Else:`<br>    `Reward = 0` |
| 304A<br><br>DRIVE | 404<br>`If distance >= target_region_size:`<br>    `Reward = 0`<br>`Elif distance < target_region_size:`<br>    `Reward = 1 - distance/target_region_size`<br>`Elif distance <= 0:`<br>    `Reward = 1` |
| 305A<br><br>OPTIMIZE | 405<br>`Reward = maximum(-1,`<br>            `minimum(1,`<br>                `(upperbound - val)/`<br>                `(upperbound - min_val)))` |

TRAINING REINFORCEMENT MACHINE LEARNING SYSTEMS

BACKGROUND

Reinforcement machine learning computer systems may be trained to accomplish complex tasks. However, it may be difficult to define a suitable reward function for evaluating outcomes obtained by the reinforcement machine learning computer system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of training a reinforcement machine learning computer system comprises providing a machine-learning computer programming language including a pre-defined plurality of reinforcement machine learning criterion statements, and receiving a training specification authored in the machine-learning computer programming language. The training specification defines a plurality of training sub-goals with a corresponding plurality of the reinforcement machine learning criterion statements supported by the machine-learning computer programming language. The plurality of training sub-goals from the training specification are computer-translated into a shaped reward function configured to score a reinforcement machine learning model configuration with regard to the plurality of training sub-goals. The method further comprises running a training experiment with the reinforcement machine learning model configuration, scoring the reinforcement machine learning model in the training experiment with the shaped reward function, and adjusting the reinforcement machine learning model configuration based on an output from the shaped reward function.

DETAILED DESCRIPTION

Machine learning systems include various computational systems that are configured to make decisions, assess data, and perform other complex tasks based on assessing a machine learning model parametrized by a learned set of machine learning parameters. Parameters refer to any computational values (e.g., numerical values, text values, etc.) that determine behavior of a machine learning model. For example, the parameters may be parameters for evaluating a mathematical function with regard to a model input and the parameters, wherein the parameters may be adjusted via training to obtain a desired behavior for the machine learning model. As one non-limiting example, the parameters may be weight values (e.g., numerical coefficients) associated with a plurality of nodes of a neural network. For example, the neural network may be configured to compute an output value based on numerically combining one or more features of input data provided to the neural network, wherein such numerical combination is determined by a mathematical function parametrized the weight values. As a non-limiting example, the neural network may include a plurality of layers arranged in order including an input layer, one or more hidden layers, and an output layer. For example, the one or more hidden layers may compute a numerical combination of features from the input layer based on the weight values, and the output layer may compute a numerical combination of features from the hidden layer(s) based on the weight values.

Machine learning systems may be configured, via machine learning training that adjusts the machine learning parameters, to solve diverse problems. As an example, machine learning systems may be trained to solve real-world tasks and/or interact with real-world systems. For example, a machine learning system may be trained to interact with one or more other computers (e.g., to send and receive information and/or invoke an application-programming interface associated with the other computer(s)). As another example, a machine learning system may be trained to control a robot or other hardware device, such as an autonomous vehicle (e.g., a quadcopter, an unmanned aircraft vehicle, or a self-driving car), an industrial manufacturing robot, a heat, ventilation and cooling (HVAC) system, and/or any other computer-controlled devices. As a non-limiting example, parameters for an autonomous vehicle may include weight values of a neural network configured to receive an input representing sensor data measured by the vehicle and to numerically process the input according to the weight values to produce an output representing a next maneuvering action by the autonomous vehicle.

A reinforcement machine learning computer system is trained by allowing the system to explore an environment and adjusting parameters of the system based on results of its interactions with the environment. For example, a reinforcement machine learning computer system may include a machine learning model configured to receive sensory information regarding a "state space," comprising a multi-dimensional set of variables representing an internal state of the machine learning computer system (e.g., a variable associated with a robot) and/or an environment in which the reinforcement machine learning computer system is configured to operate, and based on the received information, to make a decision about a next action to perform. "State space" may be used herein to refer generally to the internal state of a machine learning system and/or the state of the system with regard to its environment (e.g., its location in the environment and/or measurements obtained from the environment). Although examples described herein include simple state spaces described with regard to a simple environment, the examples presented herein are non-limiting and the techniques described herein may be applied to any suitable state space including any details about a machine learning system and/or its surroundings.

The reinforcement machine learning computer system may be trained by "rewarding" desirable outcomes and/or by "punishing" undesirable outcomes, via a programmer-defined "reward function." A reward function is a computer-assessed function that assesses a reward value (e.g., a positive value for reward and/or a negative value for punishment) for any state in the state space. In other words, a reward function measures the desirability of a particular outcome represented by the state in the state space. For example, reinforcement machine learning training may include operating the system in a real or simulated environment, and adjusting parameters of the system to cause the system to be more likely to attain desirable/rewarded outcomes and less likely to attain undesirable/punished outcomes, as measured by the reward function. As a result of reinforcement machine learning training, a reinforcement machine learning computer system may be configured to select a "best" action to perform, starting from any state in the state space. As an example, a "best" action may be an action that is predicted, by a machine learning model, to return a highest possible reward (and/or least possible punishment) over time.

It is believed that reinforcement machine learning computer systems may be configured, via reinforcement machine learning training with suitable programmer-defined reward functions, to solve complex real-world problems. For example, reinforcement machine learning computer systems may be able to succeed at human-level strategic game play, industrial control, calibration, logistics, and/or other fields of endeavor.

However, defining suitable reward functions may be difficult. For example, there may be competing objectives that must be balanced. It may be difficult, even for a programmer with substantial expertise with machine learning systems, to define an effective reward function that appropriately weighs such competing objectives. Furthermore, reward functions are often "sparse" definitions of a few select desirable and/or impermissible states in the state space. However, reward functions may not result in good reinforcement machine learning training outcomes if they are too "sparse" with regard to indicating what portions of a state space are desirable.

For example, a reward function for a chess game may indicate a high value for winning a game and a low value for losing a game. However, the state space of possible chess game configurations is extremely large and includes many states that are not a win or a loss. As such, a sparse reward function based on wins/losses may not provide suitable information for machine learning training, since wins and losses occupy only a small portion of the state space. Similarly, a reward function for a flying drone may indicate a large punishment for crashing the drone into the ground. However, there may be many states that are likely to lead to an eventual crash (e.g., a gradual loss of altitude over time) that may not be explicitly described in a sparse reward function.

Accordingly, reward functions may include "shaping" features, in the form of programmatic and/or mathematical adjustments to a reward function to assess a partial reward value for any arbitrary state in the state space. For example, a larger partial reward value may be awarded for portions of the state space that may be desirable and/or likely to lead to an eventual reward. Reward shaping provides a mechanism to guide an agent's exploration of its environment, for example by incorporating a system designer's heuristic knowledge of the relative desirability of portions of the environment into the learning process. It is believed that inclusion of suitable shaping features may substantially decrease a number of training iterations required for training a reinforcement machine learning computer system to achieve suitable performance, and/or improve final performance of a trained reinforcement machine learning computer system.

However, writing a shaped reward function substantially increases complexity for a programmer to design a reinforcement machine learning computer system, since the shaped reward function must evaluate partial reward values for any state in the state space. It is believed that some mechanisms for specifying shaped reward functions, such as Linear Temporal Logic and/or Geometric Linear Temporal Logic, are difficult for human programmers to use in practice.

Figure 1:
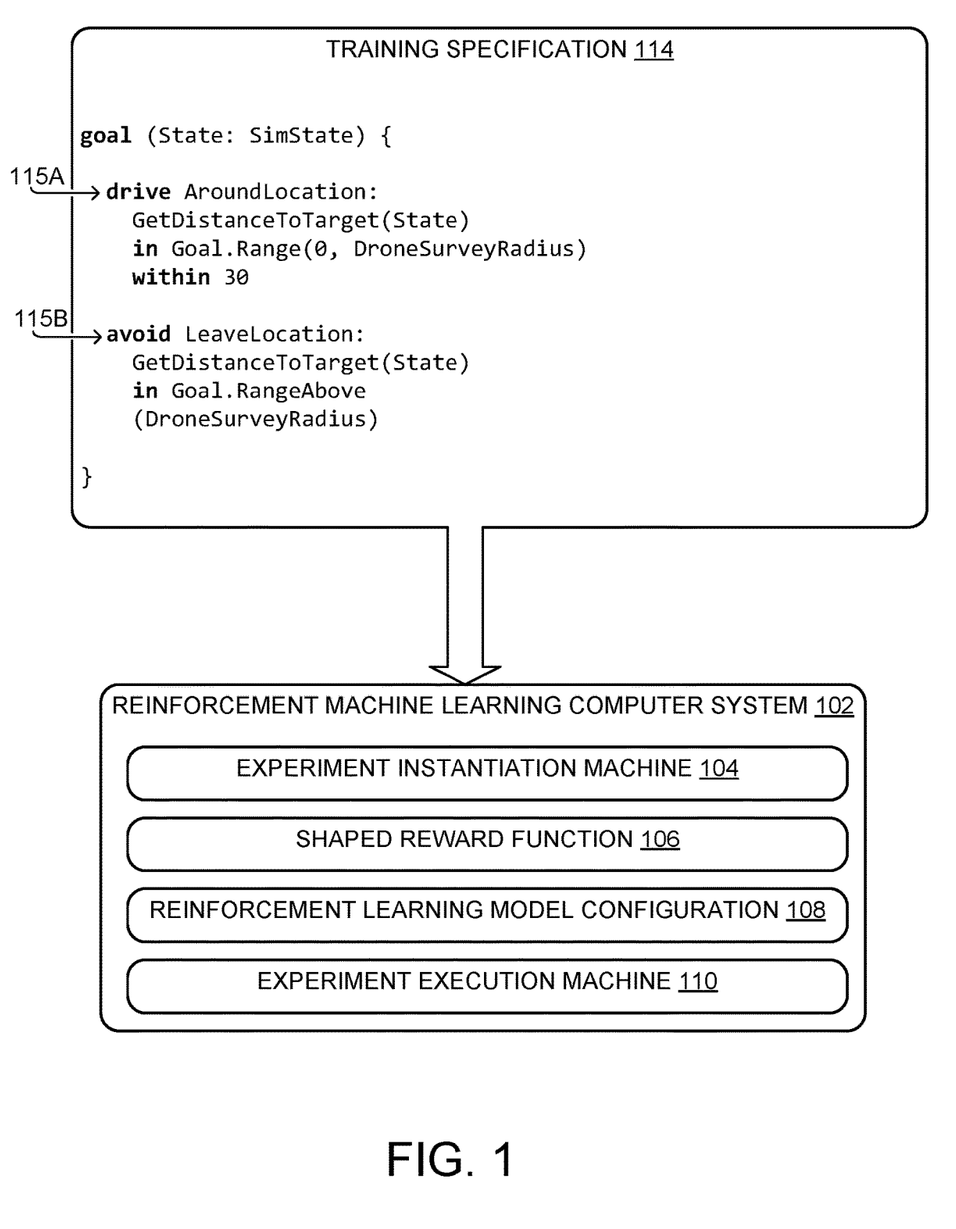
FIG. 1 shows a reinforcement machine learning computer system.

The present disclosure provides reinforcement machine learning training based on a programmer defined-goal specification that is automatically translated into a shaped reward function, thus significantly decreasing the development complexity for the programmer, significantly increasing the efficiency of the training process, and significantly increasing the likelihood of arriving at a highly effective shaped reward function. FIG. 1 shows an example of a reinforcement machine learning computer system 102 which is configured to receive a training specification 114 including a plurality of training sub-goals 115, namely training sub-goal 115A and training sub-goal 115B.

Reinforcement machine learning computer system 102 is configured to train a reinforcement machine learning model configuration 108 in one or more training experiments. A training experiment is any scenario in which the reinforcement machine learning model configuration 108 may be utilized and/or evaluated, for example with regard to performance according to any suitable metrics. For example, a training experiment may include a real-world scenario in which reinforcement machine learning computer system 102 operates the reinforcement learning model configuration 108, for example to respond to sensor data regarding real-world events and/or to perform real-world actions, e.g., by actuating hardware. As another example, a training experiment may include a simulated scenario in which reinforcement machine learning computer system 102 operates the reinforcement machine learning model configuration 108 in the context of a simulation. In the present disclosure, reinforcement machine learning training techniques are described with regard to a training experiment carried out in a simulation. However, the examples presented herein are non-limiting, and the techniques of the present disclosure may be applied to training a reinforcement machine learning configuration in any suitable training experiment(s), e.g., real-world scenario(s) and/or simulation(s).

Reinforcement machine learning computer system 102 includes an experiment instantiation machine 104 configured to instantiate a shaped reward function 106 based on the plurality of training sub-goals 114 in the training specification 114. Reinforcement machine learning computer system 102 further includes a reinforcement machine learning model configuration 108 and an experiment execution machine 110 configured to run a training experiment and select actions by operating reinforcement machine learning model configuration 108. Reinforcement machine learning model configuration 108 includes machine learning parameters which may be adjusted based on outcomes attained in the experiment and based on a reward value assessed by shaped reward function 106.

In some examples, a reinforcement machine learning computer system may be trained in a real-world environment by operating the system and measuring outcomes in the real environment (e.g., training a reinforcement machine learning computer system controlling a robot, by adjusting parameters of the reinforcement machine learning computer system based on performance of the robot at a real-world task). However, training a reinforcement machine learning computer system in a real-world environment may present costs and/or risks. For example, a reinforcement machine learning computer system that is not yet trained may obtain undesirable outcomes if it is used to operate a real-world robot prior to sufficient training. Accordingly, in some examples, a reinforcement machine learning computer system may be trained in a simulation representing the environment. Training in a simulation may reduce costs and/or risks as compared to training the reinforcement machine learning computer system in a real-world environment. The present disclosure includes examples of training reinforcement machine learning computer system 102 in a simulation. However, the examples herein are non-limiting and the techniques for reinforcement machine learning training described herein may be similarly applied to reinforcement machine learning training in a real-world environment.

As a non-limiting example, training in a simulation may include instantiating the simulation from an arbitrary state in the state space and allowing the reinforcement machine learning computer system 102 to select an action, so as to update the simulation based on the action and assess the shaped reward function 106 with regard to an updated state of the simulation. Accordingly, the reinforcement machine learning computer system 102 may be trained to predict a shaped reward value that would result from various actions, with regard to many different states in the state space. Training the reinforcement machine learning computer system 102 for a delimited period of time may be referred to as a training iteration. For example, a training iteration may include training with regard to a) one starting state, b) one action selection, c) one resulting state and d) one resulting reward assessed by shaped reward function 106 for that resulting state. Reinforcement machine learning computer system 102 may be trained in any suitable number of iterations, for example in tens, hundreds, thousands, or more simulated iterations. A training session including a plurality of related iterations is a training "episode." An episode may be start at an arbitrary (e.g., randomly-sampled) point within the state space, and reinforcement machine learning computer system 102 may explore the state space and/or attempt to achieve a target state within the state space. In some examples, reinforcement machine learning computer system 102 may be required to achieve the target state within a limited number of iterations (e.g., within 100 to 1000 iterations). In some examples, a training episode may be terminated early based on recognizing a termination condition (e.g., based on recognizing a successful outcome where no further actions are required, or based on recognizing an undesirable outcome from which recovery is unlikely or impossible).

The programmer-defined training specification 114 includes a plurality of training sub-goals (e.g., training sub-goal 115A and training sub-goal 115B) that represent desirable and/or undesirable outcomes that may occur within training. However, the programmer does not need to explicitly define shaped reward function 106. Instead, the shaped reward function 106 is automatically computer-generated based on the "high-level" training specification 114 provided by the programmer. The high-level description of goal semantics in training specification 114 is automatically translated into low-level shaped reward function 106 as described herein.

Shaped reward function 106 is one non-limiting example of a goal-oriented mechanism for training a machine learning policy. Alternately or additionally, a training specification as described herein may be processed to automatically derive a termination condition for determining when to terminate reinforcement machine learning training episodes, thereby obviating any programmer requirement to explicitly define a termination condition. Alternately or additionally, the training specification may be processed to automatically derive one or more performance metrics for a reinforcement machine learning computer system that may be automatically measured during training. One non-limiting example of a performance metric that may be tracked for a reinforcement machine learning computer system based on a training specification is "percentage of training episodes in which one or more sub-goals were successful." Training specifications as described herein may be written in a simple format including a listing of sub-goals (e.g., as shown in training specification 114), without the need for a complicated syntax for specifying exact outcomes of training.

Figure 2:
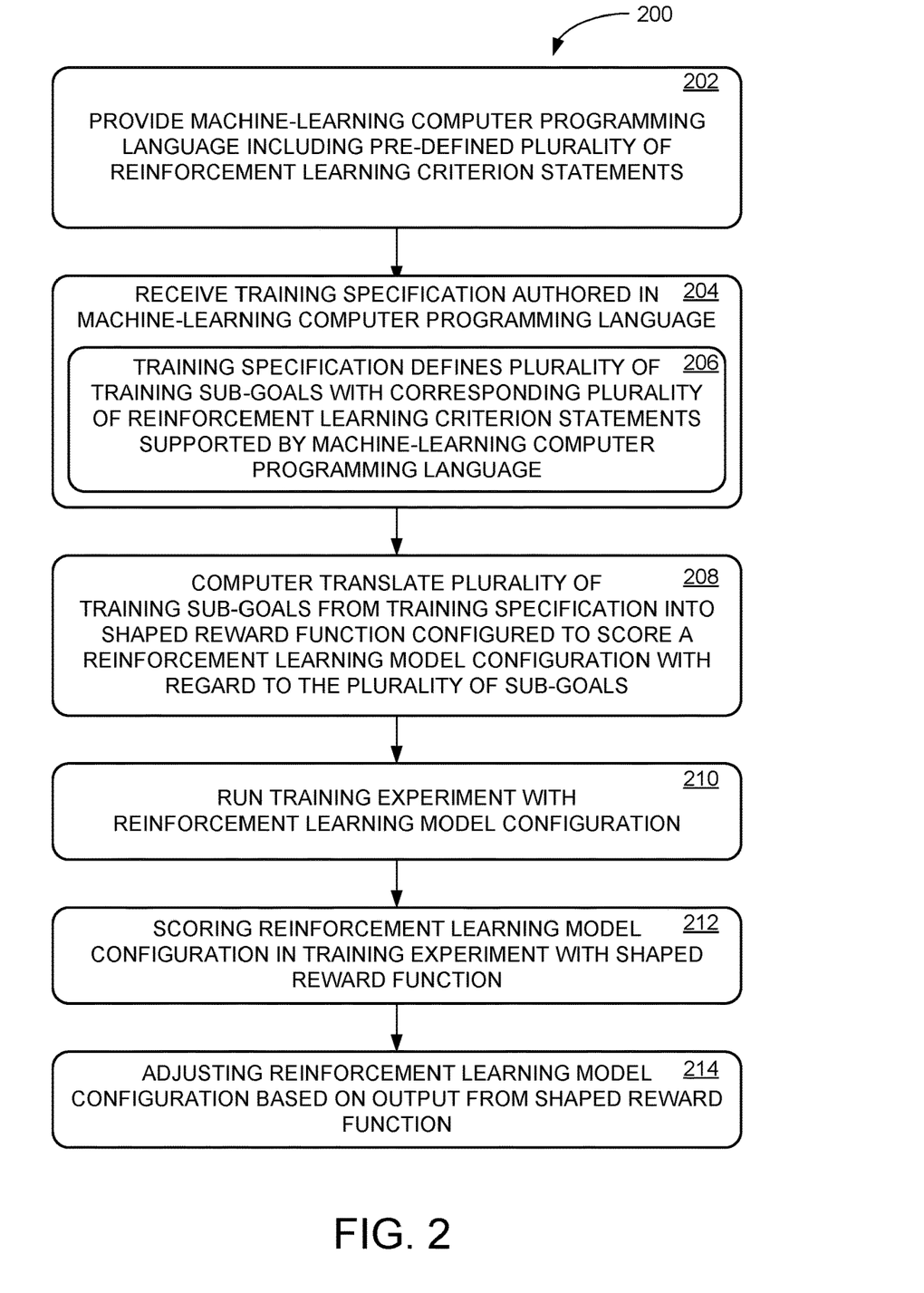
FIG. 2 shows a method of training a reinforcement machine learning computer system.

The methods described herein permit a reinforcement machine learning computer system to be designed based on the training specification, without requiring a programmer to explicitly define a shaped reward function, termination condition, and/or performance metrics. Nonetheless, according to the methods of the present disclosure, a shaped reward function, termination condition, and performance metrics may each be automatically derived by an experiment instantiation machine 104 based on the plurality of sub-goals defined in the training specification. For example, experiment instantiation machine 104 may automatically derive the shaped reward function, termination condition, and/or performance metrics in accordance with a method 200, described below.

Training sub-goals describe desired outcomes that reinforcement machine learning computer system 102 may be trained to achieve. For example, training specification 114 shows a non-limiting example of a syntax for a machine-learning computer programming language configured to express training sub-goals using a plurality of different pre-defined training criterion statements, including a "drive" criterion statement and an "avoid" criterion statement. As a non-limiting example, reinforcement machine learning computer system 102 may be configured to control a drone for surveying a geospatial area, for example by maneuvering within the geospatial area while operating sensors, without leaving the geospatial area. Accordingly, training sub-goal 115A is an exemplary sub-goal using the "drive" training criterion statement to express the idea of driving the drone around within the geospatial area. For example, the drive command may be given any suitable semantics. As a non-limiting example, satisfying the "drive" training criterion may include allowing the drone to leave a target region, but once it has left the target region, causing the drone to return to the target region as quickly as possible and within a fixed number of steps (e.g., within 30 training iterations as indicated by the drive training criterion in training sub-goal 115A). Training sub-goal 115A includes a label "AroundLocation" indicating a programmer-defined goal name indicating a description of the sub-goal. Training sub-goal 115A further includes exemplary syntax indicating that the goal is met by getting to a target state defined by having the drone radius be located within a defined drone survey radius, within 30 iterations in a training episode. Training sub-goal 115B is an exemplary sub-goal using the "avoid" training criterion statement to express the idea of staying within the geospatial area, e.g., by avoiding leaving the area. Training sub-goal 115B includes a label "LeaveLocation" describing the sub-goal, and indicates the state to be avoided, namely when the drone is a distance greater than a drone survey radius away from the target location. For example, training sub-goal 115B could be used to configure a drone to roam freely within a survey area without leaving the survey area. A programmer may use any suitable set of sub-goals defined via the pre-defined criterion statements to design a suitable shaped reward function 106, without needing to explicitly design the exact reward that will be awarded based on the individual pre-defined criterion statements. Experiment instantiation machine 104 is configured to automatically generate shaped reward function 106 based on processing the sub-goals. In particular, experiment instantiation machine 104 is configured to automatically computer-generate a sub-goal specific reward function for each sub-goal based on the pre-defined criterion statement of the sub-goal, and to automatically computer-compose the sub-goal specific reward functions into an overall shaped reward function 106. Shaped reward function 106 is thus configured, based on the plurality of sub-goals established by the programmer, to assess a partial reward value for any state, based on computer-assessing the status of the sub-goals in training specification 114. Accordingly, shaped reward function 106 may be used for training in a plurality of simulated training iterations and/or episodes. For example, shaped reward function 106 may be used to adjust the reinforcement machine learning model configuration 108 so that it successfully stays in a specified location and avoids going too far from that location.

Reinforcement machine learning computer system 102 is one non-limiting example of a system that may use a training specification (e.g., training specification 114) and a goal-oriented mechanism for training (e.g., shaped reward function 106). FIG. 2 more generally shows an exemplary method 200 for training a reinforcement machine learning computer system based on a training specification.

At 202, method 200 includes providing a machine-learning computer programming language including a pre-defined plurality of reinforcement machine learning criterion statements. For example, reinforcement machine learning computer system 102 of FIG. 1 is configured to parse, interpret, and/or execute statements in the machine-learning computer programming language. Returning to FIG. 2, at 204, method 200 includes receiving a training specification authored in the machine-learning computer programming language. For example, reinforcement machine learning computer system 102 of FIG. 1 is configured to receive training specification 114. As illustrated at 206, a training specification can define a plurality of training sub-goals with a corresponding plurality of the reinforcement machine learning criterion statements supported by the machine-learning computer programming language. For example, FIG. 1 showed an exemplary training sub-goal 115A using a pre-defined "drive" criterion statement, and another exemplary training sub-goal 115B using a pre-defined "avoid" criterion statement.

Figure 3:
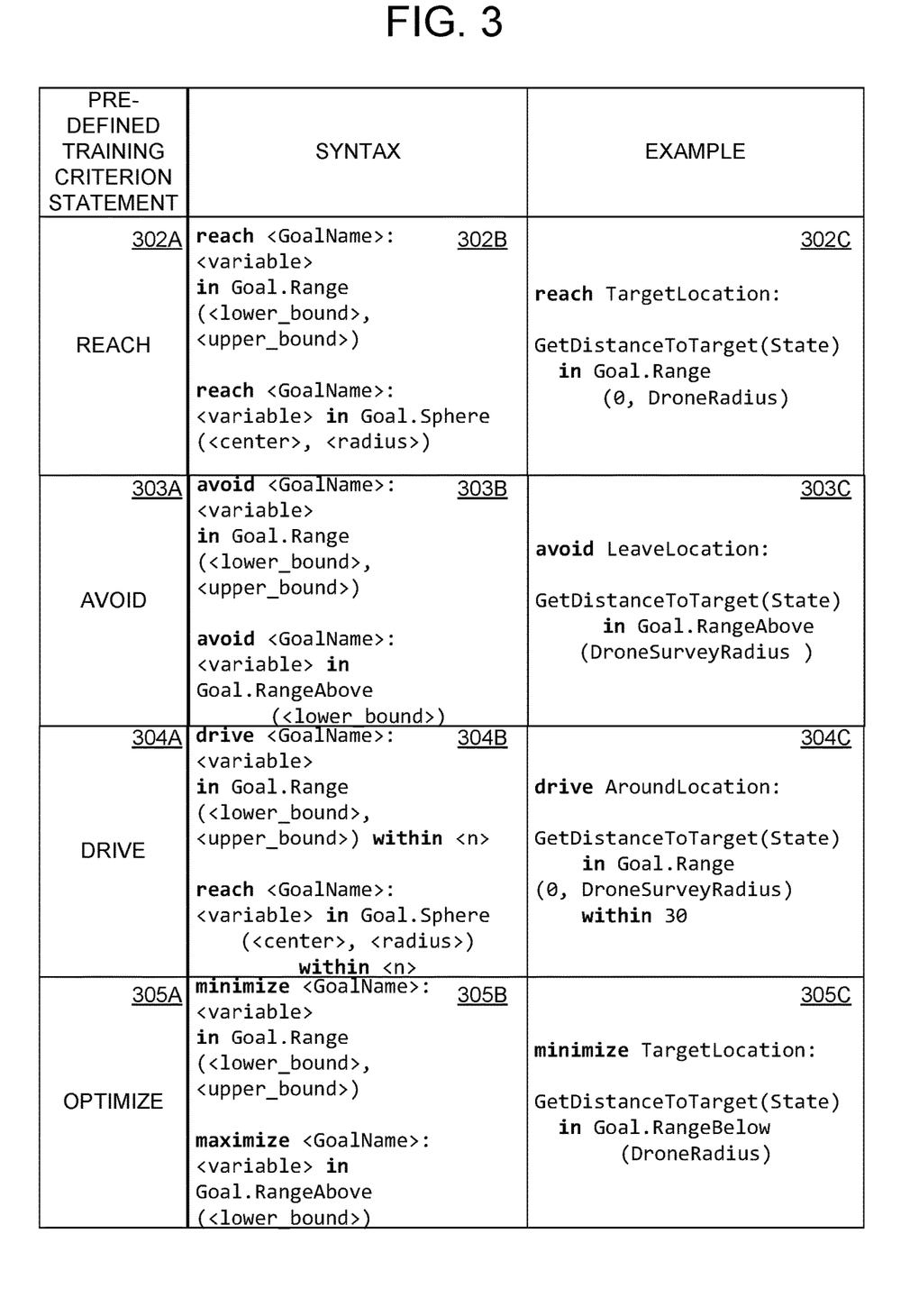
FIG. 3 shows example machine learning programming language syntax.

FIG. 3 shows further examples of pre-defined criterion statements and sub-goals for an example machine-learning computer programming language. FIG. 3 is a table including, in each row, an exemplary pre-defined criterion statement along with non-limiting examples of a corresponding syntax and an exemplary sub-goal expressed using the corresponding syntax for the example machine-learning computer programming language.

"Reach" statement 302A is a pre-defined criterion statement indicating a target aspect of the training experiment to be reached in the training experiment. In other words, "reach" statement 302A describes a sub-goal of getting to a target aspect of state space as quickly as possible. For example, the target aspect could be a region of a 3D space (e.g., a target location for a drone), and/or a portion of state space having desired properties (e.g., a desired temperature range for an HVAC system). "Reach" statement 302A has an exemplary syntax 302B specifying a "label" (e.g., "TargetLocation" as in example 302C) which is a description that can be used to refer to sub-goals (e.g., for performance metrics, as will be described below). Exemplary syntax 302B further specifies a "variable" placeholder indicating an aspect of a training experiment to measure with regard to the goal (e.g., in example 302C "GetDistanceToTarget(State)" refers to the distance between a drone and a target location as defined by the experiment state). Exemplary syntax 302B further specifies a criterion according to which to measure the aspect of the training experiment, for example as a range of admissible distances from the target location, and/or as a location within a sphere defined with regard to the target location. For example, example 302C specifies that the drone should get within a distance range from the target of between 0 (e.g., exactly at the target) and one drone radius (e.g., positioned so that the drone is very near and/or overlapping the target).

"Avoid" statement 303A is a pre-defined criterion statement indicating an aspect of the training experiment to be avoided in the training experiment. For example, an "avoid" statement may indicate that a drone should avoid getting too near a stationary object or leaving a defined radius, or that an HVAC system should avoid letting a temperature drop below a target value. In other words, "avoid" statement 303A describes a sub-goal of avoiding a target region. "Avoid" statement 303A has an exemplary syntax 303B which is analogous to syntax 302B of "reach" statement 302A. However, the goal defined by an "avoid" statement 303A is to avoid reaching the conditions defined in the statement. For example, example 303C specifies a sub-goal of keeping a drone from ever going outside of a drone survey radius distance from the target location (e.g., setting a perimeter the drone is not allowed to leave). Accordingly, a reinforcement machine learning computer system would successfully achieve this goal by keeping the drone within the drone survey radius, and/or would fail this goal by causing the drone to leave the drone survey radius.

"Drive" statement 304A is a pre-defined criterion statement describing a sub-goal of getting back to a defined region as quickly as possible after exiting the defined region. In other words, "drive" maintains an aspect of a training experiment with regard to a set boundary. The aspect is allowed to deviate from the set boundary, for at most a maximum duration of time. The reinforcement machine learning system is configured, via training, to return the aspect to within the set boundary within such maximum duration after the deviation occurs. For example, "drive" could be used to describe a sub-goal of allowing a drone to roam freely within the defined region, or a sub-goal for an HVAC system to allow a temperature to deviate somewhat while also ensuring that it will eventually return within a set boundary. "Drive" statement 304A may be specified with an exemplary syntax 304B analogous to the other statements shown in FIG. 3. In addition to showing a label (e.g., "AroundLocation" in example 304C) and an aspect of the experiment to measure (e.g., GetDistanceToTarget(State)) with regard to a criterion (e.g., getting the distance to the target state within the drone survey radius), within a fixed number of steps. If specified with the "within <n>" syntax as shown in example 304C, the sub-goal requires achieving the specified distance to the target state within n iterations, e.g., getting to within the drone survey radius distance from the target location, within 30 iterations, as defined in example 304C. If the "within <n>" syntax is not provided, the "drive" statement may be automatically configured to require returning to the target region within a pre-defined maximum number of iterations.

"Optimize" statements 305A may take the form of any suitable syntax for describing an aspect of a training experiment state to be optimized, for example minimization or maximization. For example, exemplary syntax 305B shows example statements for minimizing a variable within a range, and for maximizing a variable above a lower bound. As another example, example 305C shows a sub-goal for getting a drone to be as close as possible to a target and within a drone's radius of the target. Further examples of optimize statements may concern, for example, maximizing rate of output for a logistics control system, or minimizing energy usage for an HVAC system.

The examples shown in FIG. 3 are non-limiting. In addition to the exemplary pre-defined criterion statements and syntax shown in FIG. 3, other criteria pertinent to training may be provided in a machine-learning computer programming language via additional pre-defined criterion statements. Furthermore, the example syntax is non-limiting. For example, although various pre-defined criterion statements were shown in various combinations with different kinds of syntax for ranges (e.g., Goal.Range, Goal.RangeBelow, Goal.RangeAbove, and Goal.Sphere), any of the pre-defined criterion statement may be used along with any suitable programmatic definition of ranges of state space. Furthermore, although the examples shown in FIG. 3 are with regard to keeping a distance from a target within a defined range, the variable used in a pre-defined training criterion statement may refer to any aspect of a state space. As further non-limiting examples, in addition to distance from target, variables may refer to sensory inputs to a robot or computational agent, a score in a strategic game, etc. By allowing a programmer to specify desired behavior with regard to individual aspects of a training experiment, via a plurality of separate and/or independent sub-goals, the methods and systems of the present disclosure allow a programmer to focus on individual aspects of the system one at a time. The potentially complicated definition of a suitable shaped reward function from the plurality of criteria is determined automatically by experiment instantiation machine 104 and/or by any other computer system configured to implement method 200.

Returning to FIG. 2, at 208, method 200 further includes computer-translating the plurality of training sub-goals from the training specification into a shaped reward function configured to score a reinforcement machine learning model configuration with regard to the plurality of training sub-goals. For example, experiment instantiation machine 104 of FIG. 1 is configured to computer-translate the plurality of sub-goals from training specification 114 into shaped reward function 106. In some examples, shaped reward function 106 may be configured to increase a score for the reinforcement machine learning model configuration responsive to completing a training sub-goal. Alternately or additionally, shaped reward function 106 may be configured to decrease a score for the reinforcement machine learning model configuration responsive to failing a training sub-goal. For example, the shaped reward function 106 may be configured to score the reinforcement machine learning model configuration with a positive reinforcement score for completing one of the training sub-goals. Alternately or additionally, the shaped reward function 106 may be configured to score the reinforcement machine learning model configuration with a negative reinforcement score for failing one of the training sub-goals.

In some examples, computer-translating the plurality of sub-goals into the shaped reward function may include automatically computer translating each sub-goal into a sub-goal specific reward function, and computer-composing the resulting plurality of sub-goal specific reward functions into the shaped reward function. As a non-limiting example, computer-composing the plurality of sub-goal specific reward functions into the shaped reward function may include evaluating each sub-goal specific reward function and defining the shaped reward function output as a sum of the outputs of the sub-goal specific reward functions. Alternately or additionally to an approach based on summing the sub-goal specific reward functions, any other suitable approach to composing reward functions into a shaped reward function may be employed. As a non-limiting example, instead of directly summing sub-goal specific reward functions, sub-goal specific reward functions may be summed in a weighted combination, wherein each sub-goal has a different weight. In some examples, the weights for different sub-goals may be automatically tuned, e.g., by a machine learning system. Alternately or additionally, the weights may be tuned by a user.

As another non-limiting example, the shaped reward function may be evaluated based on a mathematical potential function defined in terms of the sub-goal specific reward functions. As another non-limiting example, a shaped reward function may be derived based on pareto reinforcement learning. For example, a machine learning system may be configured to define a reward surface based on identifying different candidate sets of sub-goals that lead to a similar reward value. Alternately or additionally, the machine learning system may be configured to find an optimal combination of sub-goals such that satisfying different combinations of sub-goals would lead to a sub-optimal result. Based on the reward surface and/or optimization, a weight may be assigned to each sub-goal. Accordingly, based on the weights assigned to sub-goals, a combination of sub-goals that provides a best possible solution may be found exactly and/or approximated.

Alternately or additionally, a shaped reward function may be generated based on finding the reward function that would best represent the specified goals by simultaneous optimization of the shaped reward function definition and a machine learning system being trained according to the shaped reward function. For example, different sub-goals may be assumed to have an equal importance (e.g., an identical 'weight' for a weighted combination). Irrespective of whether different sub-goals have different weights, a machine learning system and/or shaped reward function may be simultaneously optimized so as to derive a suitable compound reward as a mathematical function of the different sub-goals. In some examples, a shaped reward function may be derived based on the plurality of sub-goals using a state-of-the-art and/or future machine learning technique, for example, via the "reward machine" approach. As described above, a shaped reward function may be generated by automatically computer composing a plurality of sub-goal specific reward functions. Accordingly, shaped reward functions may be fully defined based on deriving sub-goal specific reward functions for each type of sub-goal in the training specification. For example, shaped reward functions according to the present disclosure may be automatically derived based on automatically computer-composing subgoal specific reward functions for each of a plurality of different criterion statements (e.g., "reach," "avoid," "drive," and/or "optimize").

Figure 4:
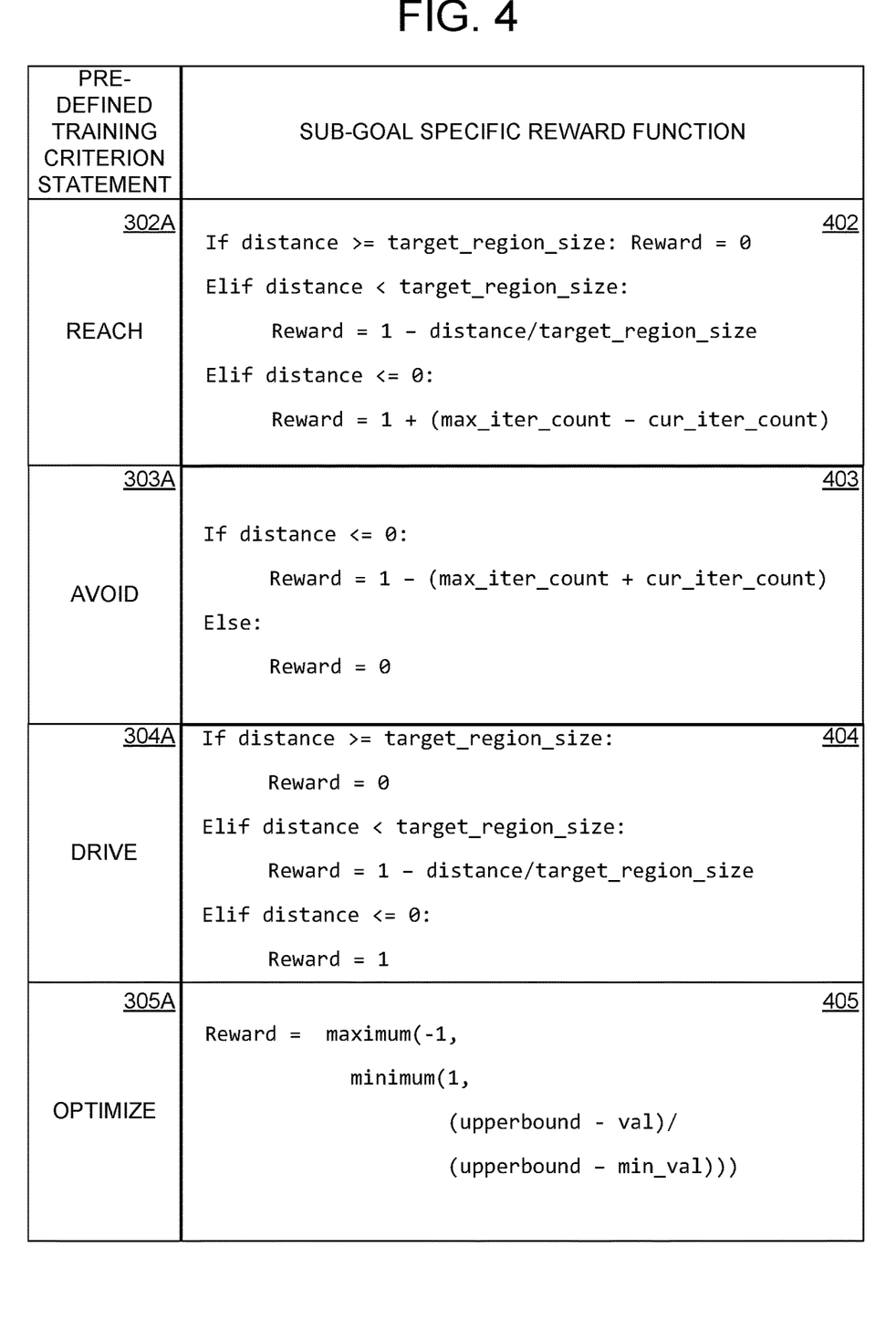
FIG. 4 shows examples of sub-goal specific reward functions.

Non-limiting examples of sub-goal specific reward functions for each criterion statement are shown in FIG. 4. For a sub-goal defined with the "reach" statement 302A, a non-limiting example of a sub-goal specific reward function 402 awards 0 reward if the distance to the target is outside of the target region size. If the distance to the target is within the target region size, the reward shaping function 402 awards 1−(distance/target_region_size), i.e., how close the distance is as a proportion of the target. If the distance reaches 0 (e.g., the target is reached), then the reward shaping function 402 awards a terminal reward based on the number of iterations so far (e.g., a higher reward is granted for reaching the target in relatively few iterations, relative to a pre-defined maximum iteration count).

For a sub-goal defined with the "avoid" statement 303A, according to a non-limiting exemplary sub-goal specific reward function 403, reaching the target region defined in the "avoid" statement results in a negative reward value (e.g., a penalty) defined based on the iteration count (e.g., 1 minus the total of the maximum iterations and the current number of iterations).

As another non-limiting example, sub-goal specific reward function 404 for "drive" statement 304A is similar to the "reach" sub-goal specific reward function. However, in comparison, sub-goal specific reward function 404 awards a value of just 1 even if a target is reached, instead of awarding a higher goal based on the number of iterations so far as with sub-goal specific reward function 402. Optionally, if the "drive" goal fails in the sense that the target region is not found within the specified number of steps, the reward may alternately be set to (1−(max_iter_count-cur_iter_count), e.g., the reward may be set to a negative value (or penalty) based on the number of iterations so far.

Sub-goal specific reward function 405 is a non-limiting example of a reward function for an optimize statement, e.g., for a minimize statement. For example, the reward for a minimize statement may be defined based on being at most 1, at least −1, and otherwise defined by the ratio between the difference between an upper bound for the minimization and a minimum value estimated to have been reached in the state space based on a predefined number of samples gathered during training. Other sub-goal specific reward functions may be alternately or additionally defined for other minimization and/or maximization statements. For example, for a minimization with an upper and lower bound, the reward may be set to a value between −1 and 1 defined by −(2*val-(lowerbound+upperbound))/(upperbound−lowerbound). Sub-goal specific reward functions may be analogously defined for maximization statements. In some examples, sub-goal specific reward functions may be derived according to a fixed and/or pre-defined definition. In other examples, the derivation of each sub-goal specific reward function may be controlled by one or more hyperparameters of a machine learning system. For example, cost values for a sub-goal specific reward function may be adjusted based on machine learning training performance (e.g., system accuracy and/or training performance, such as number of iterations required to achieve a suitable performance). Accordingly, sub-goal specific reward functions may be generated according to the hyperparameter(s) so as to improve the long-term performance of training the machine learning system by selecting suitable shaped reward functions during training.

Returning to FIG. 2, at 210, method 200 further includes running a training experiment with the reinforcement machine learning model configuration. For example, as shown in FIG. 1, experiment execution machine 110 is configured to run reinforcement learning model configuration 108. As described above, the training experiment may include a plurality of iterations and/or episodes. Returning to FIG. 2, at 212, method 200 further includes scoring the reinforcement machine learning model in the training experiment with the shaped reward function, e.g., by scoring a state attained based on actions selected by the reinforcement machine learning model, using the shaped reward function to assess progress towards sub-goals as described above. As shown in FIG. 1, experiment execution machine 110 is configured to score reinforcement learning model configuration 108, using the shaped reward function 106 generated by experiment instantiation machine 104. Returning to FIG. 2, at 214, method 200 further includes adjusting the reinforcement machine learning model configuration based on an output from the shaped reward function. For example, the reinforcement machine learning model configuration may be adjusted according to any suitable reinforcement machine learning methodology (e.g., deep Q learning).

In some examples, the training experiment may include a default end point, e.g., a maximum number of training iterations and/or episodes. Alternately or additionally, an experiment execution machine may be configured to computer-assess a termination condition based on the plurality of training sub-goals, and terminating the training experiment prior to the default end responsive to detecting the termination condition. For example, as shown in FIG. 1, experiment instantiation machine 104 is configured to generate a suitable termination condition based on the plurality of sub-goals in training specification 114, and experiment execution machine 110 is configured to execute reinforcement learning model configuration 108 until the termination condition is reached and/or for a maximum number of iterations.

Figure 5:
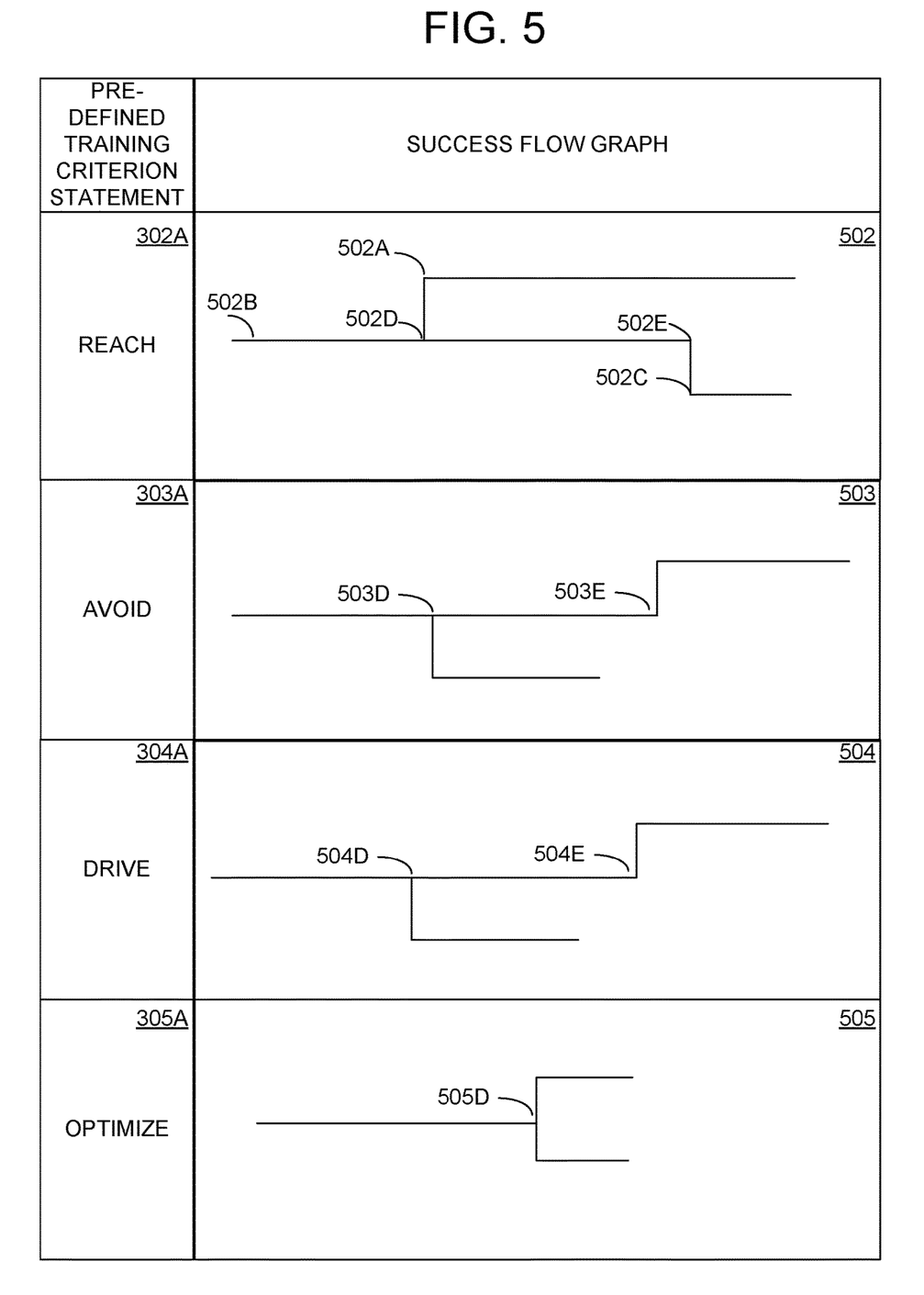
FIG. 5 shows examples of sub-goal specific success flow graphs.

For example, computer-assessing the termination condition may include maintaining, for each training sub-goal of the plurality of training sub-goals, a success-flow graph representing a termination decision with regard to that sub-goal. FIG. 5 shows success flow graphs for the predefined criterion statements described above. For example, the termination condition may be defined with regard to failing any sub-goal of the plurality of training sub-goals defined in the success-flow graphs. As another example, the termination condition may be defined with regard to succeeding all of the sub-goals. Accordingly, the experiment may be terminated early if there would be no reason to continue (e.g., if any sub-goal is failed, or if all of the sub-goals are completed already). If the termination condition is not ever assessed to be true, then a training episode may be run for a pre-defined maximum number of iterations before automatic termination.

As shown in FIG. 5, success-flow graph 502 for the "reach" statement 302A is a directed graph leading to a tri-state result value at the right of the graph, indicating success (upper line at 502A), failure (bottom line at 502C), or undecided (middle line at 502B). For "reach" statement 302A, the status is successful if the target region is reached at 502D, undecided if the target region is not yet reached but the experiment is not yet over, and failure if the experiment ends before the target region is reached at 502E. Otherwise (e.g., before the experiment ends), the result is undecided.

Success-flow graph 503 for the "avoid" statement 303A is a similar directed graph, but in contrast to the graph for "reach" statement 302A, if the specified condition is reached before the end of a training episode at 503D, then failure is the result (as the condition to be avoided was undesirably reached). If the training episode ends at 503E, then instead success is the result (as the condition to be avoided was successfully avoided throughout the episode). Otherwise (e.g., before the experiment ends), the result is undecided.

Success-flow graph 504 for the "drive" statement 304A is a similar directed graph. At 504D, if the target is not reached within the designated n iterations (e.g., within 30 iterations with regard to the example shown in FIG. 1 and FIG. 3). At 504E, if the training episode ends and the target was always reached within the designated number of iterations, then success is the result. Otherwise (e.g., before the experiment ends), the result is undecided.

Success-flow graph 505 for an "optimize" statement 305A is another similar directed graph. The result is undecided until the end of the episode. At the end of the episode, at 505D, if the average of the variable to be minimized is lower than the specified lower bound, then the result is success. Otherwise, if the average of the variable to be minimized is higher than the specified lower bound, then the result is failure. Success-flow graphs for other optimization statements (e.g., for maximize statements) may be defined analogously (e.g., for a maximize statement the result at the end of the episode is success if the average exceeds a specified upper bound, and a failure if the average is lower than the specified upper bound).

As described above, a training sub-goal may have an associated label (e.g., "AroundLocation" or "LeaveLocation". In some examples, a training experiment may be configured to log information pertaining to the human-readable label into an experiment log. For example, the logged information may include scores assessed by a shaped reward function, whether termination conditions were assessed to result in early termination, and/or performance metrics pertaining to the sub-goal. The use of the human-readable label may facilitate analysis of the experiment log. For example, method 200 may further comprise computer-indexing the experiment log based on the human-readable label(s) associated with one or more sub-goals. For example, the experiment log may be indexed to find all of the instances of successes and/or failures, and/or to extract performance information related to a particular sub-goal. In some examples, the information pertaining to the human-readable label may include debugging information (e.g., information pertaining to internal states of the reinforcement machine learning computer system during the experiment).

In addition to determining a shaped reward function, an experiment instantiation machine (e.g., experiment instantiation machine 104 of FIG. 1) may optionally further comprise assessing a performance metric for training based on the plurality of training sub-goals. For example, the performance metric may include a frequency of successfully completing a sub-goal during the training experiment. Alternately or additionally, the performance metric for training may include a criterion-specific performance metric for one of the pre-defined plurality of reinforcement machine learning criterion statements (e.g., a performance metric for measuring performance with regard to all 'avoid' statements or with regard to all 'drive' statements). Shaped reward functions and/or performance metrics may provide substantially richer feedback (e.g., to an algorithm for training a reinforcement machine learning computer system and/or to a human programmer designing the reinforcement machine learning computer system) as compared to simple reward functions. It is believed that the methods described herein may permit a programmer of a reinforcement machine learning computer system to be better able to refine training of the system, and cause the system to achieve desired outcomes.

Non-limiting examples of performance metrics pertaining to a "reach" criterion statement include:

Success: whether or not the goal was reached.

Success rate: an observed frequency of the goal being reached over a predefined number of previous training episodes (e.g., a percentage).

Satisfaction per state space dimension: for each aspect of the state space, how close to being accomplished the goal was with regard to that dimension (e.g., satisfaction per state space dimension would be 1 in every dimension if the goal were perfectly satisfied, and 0 for a dimension if the goal is not at all satisfied with regard to that dimension).

Distance per state space dimension: how far away from the goal for each aspect of the state space.

Goal satisfaction rate: an overall rate (over all training episodes) for reaching the goal.

Non-limiting examples of performance metrics pertaining to an "avoid" criterion statement may be defined similarly, e.g., a success metric for whether a target aspect of state space was successfully avoided, a success rate metric, a success per dimension metric, and/or a goal satisfaction rate. Non-limiting examples of performance metrics pertaining to a "drive" criterion may be defined similarly, e.g., success, success rate, etc. Other examples of performance metrics for a "drive" criterion include a percentage of iterations spent in a target region, a maximum number of iterations it takes to reach the target region, a minimum number of iterations it takes to take the target region, and/or an average number of iterations it takes to reach the target region. Similarly, non-limiting examples of goal assessment metrics for optimization goals include success, success rate, and/or success per dimension metrics.

Performance metrics may also be defined for multiple goals or for overall assessment of all goals. For example, a success rate metric may be assessed with regard to an observed frequency of all goals being successful in the past predefined number of episodes. The above examples of performance metrics are non-limiting. The machine learning programming language of the present disclosure may support any suitable sub-goals (e.g., defined via any suitable plurality of pre-defined training criterion statements). Accordingly, any suitable performance metric of the system may be measured with regard to a particular sub-goal, a particular type of criterion statement, etc.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
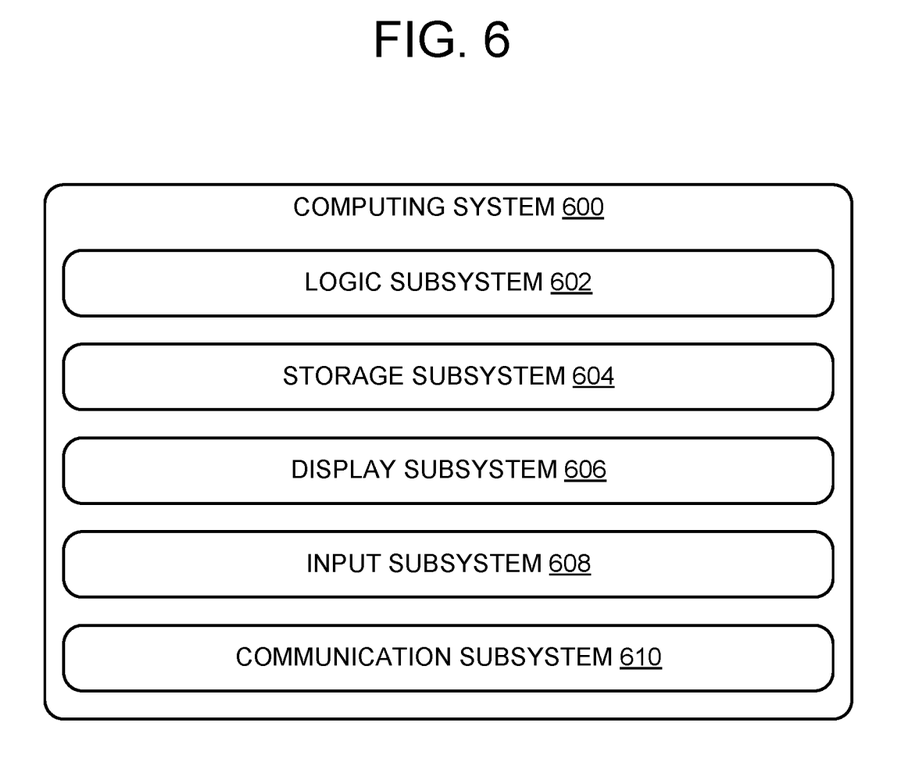
FIG. 6 shows an exemplary computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6. Computing system 600 may be a reinforcement machine learning computer system 102. For example, computing system 600 may implement method 200 in order to train a reinforcement machine learning model configuration 108 with a shaped reward function 106.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem 602 executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. Examples of machines that may be instantiated by computing system 600 include experiment instantiation machine 104, and experiment execution machine 110.

Machines may be implemented using any suitable combination of state-of-the-art and/or future machine learning (ML), artificial intelligence (AI), and/or natural language processing (NLP) techniques. For example, reinforcement machine learning model configuration 108 may be configured according to any suitable combination of ML, AI, and/or NLP techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement machine learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method of training a reinforcement machine learning computer system, comprising:
   providing a machine-learning computer programming language including a pre-defined plurality of reinforcement machine learning criterion statements;
   receiving a training specification authored in the machine-learning computer programming language, wherein the training specification defines a plurality of training sub-goals with a corresponding plurality of the reinforcement machine learning criterion statements supported by the machine-learning computer programming language;
   computer translating the plurality of training sub-goals from the training specification into a shaped reward function configured to score a reinforcement machine learning model configuration with regard to the plurality of training sub-goals;
   running a training experiment using the reinforcement machine learning model configuration;
   scoring the reinforcement machine learning model in the training experiment with the shaped reward function; and
   adjusting the reinforcement machine learning model configuration based on an output from the shaped reward function.

2. The computer-implemented method of claim 1, wherein a training sub-goal of the plurality of training sub-goals includes a human-readable label, and wherein the training experiment is configured to log information pertaining to the human-readable label into an experiment log.

3. The computer-implemented method of claim 2, further comprising computer indexing the experiment log based on the human-readable label.

4. The computer-implemented method of claim 2, wherein the information pertaining to the human-readable label includes debugging information.

5. The computer-implemented method of claim 2, wherein the information pertaining to the human-readable label includes a performance metric.

6. The computer-implemented method of claim 1, wherein the shaped reward function is configured to increase a score for the reinforcement machine learning model configuration responsive to completing one of the training sub-goals.

7. The computer-implemented method of claim 1, wherein the shaped reward function is configured to decrease a score for the reinforcement machine learning model configuration responsive to failing one of the training sub-goals.

8. The computer-implemented method of claim 1, wherein the training experiment includes a default end, the method further comprising computer-assessing a termination condition based on the plurality of training sub-goals, and terminating the training experiment prior to the default end responsive to detecting the termination condition.

9. The computer-implemented method of claim 8, wherein computer-assessing the termination condition includes maintaining, for each training sub-goal of the plurality of training sub-goals, a success-flow graph representing a termination decision with regard to that sub-goal.

10. The computer-implemented method of claim 8, wherein the termination condition includes failing any sub-goal of the plurality of training sub-goals.

11. The computer-implemented method of claim 1, wherein the pre-defined plurality of reinforcement machine learning criterion statements includes a reach statement indicating a target aspect of the training experiment to be reached in the training experiment.

12. The computer-implemented method of claim 1, wherein the pre-defined plurality of reinforcement machine learning criterion statements includes an avoid statement indicating an aspect of the training experiment to be avoided in the training experiment.

13. The computer-implemented method of claim 1, wherein the pre-defined plurality of reinforcement machine learning criterion statements includes a drive statement indicating a maximum duration in which an aspect of the training experiment is allowed to deviate from a set boundary.

14. The computer-implemented method of claim 1, wherein the pre-defined plurality of reinforcement machine learning criterion statements includes an optimization statement indicating an aspect to be optimized in the training experiment.

15. The computer-implemented method of claim 1, further comprising assessing a performance metric for training based on the plurality of training sub-goals.

16. The computer-implemented method of claim 15, wherein the performance metric for training includes a frequency of successfully completing a sub-goal during the training experiment.

17. The computer-implemented method of claim 15, wherein the performance metric for training includes a criterion-specific performance metric for one of the pre-defined plurality of reinforcement machine learning criterion statements.

18. The computer-implemented method of claim 1, wherein translating the plurality of training sub-goals into the shaped reward function includes computer composing a plurality of sub-goal specific reward functions.

19. A reinforcement machine learning computer system, comprising:
an experiment instantiation hardware machine configured to:
receive a training specification authored in a machine-learning computer programming language including a pre-defined plurality of reinforcement machine learning criterion statements, wherein the training specification defines a plurality of training sub-goals with a corresponding plurality of the reinforcement machine learning criterion statements supported by the machine-learning computer programming language; and
automatically translate the plurality of training sub-goals from the training specification into a shaped reward function configured to automatically score a reinforcement machine learning model configuration with regard to the plurality of training sub-goals; and
an experiment execution hardware machine configured to:
run a training experiment of the reinforcement machine learning model configuration;
score the reinforcement machine learning model in the training experiment with the shaped reward function; and
adjust the reinforcement machine learning model configuration based on an output from the shaped reward function.

20. A reinforcement machine learning computer system, comprising:
a hardware logic machine; and
a hardware storage machine holding instructions executable by the hardware logic machine to:
receive a training specification authored in a machine-learning computer programming language, wherein the training specification defines a plurality of training sub-goals with a corresponding plurality of reinforcement machine learning criterion statements supported by the machine-learning computer programming language;
automatically translate the plurality of training sub-goals from the training specification into a shaped reward function configured to automatically score a reinforcement machine learning model configuration;
run a training experiment with the reinforcement machine learning model configuration; and
score the reinforcement machine learning model in the training experiment with the shaped reward function.

* * * * *